United States Patent [19]

Oestreich

[11] 4,434,610
[45] Mar. 6, 1984

[54] PIPE STORE FOR SZ STRANDING

[75] Inventor: Ulrich Oestreich, Munich, Fed. Rep. of Germany

[73] Assignee: Siemens Aktiengesellschaft, Berlin & Munich, Fed. Rep. of Germany

[21] Appl. No.: 474,160

[22] Filed: Mar. 10, 1983

[30] Foreign Application Priority Data

Mar. 23, 1982 [DE] Fed. Rep. of Germany ....... 3210611

[51] Int. Cl.³ ........................... D07B 3/00; D07B 7/00
[52] U.S. Cl. ..................................................... 57/294
[58] Field of Search ...................... 57/6, 293, 294, 138

[56] References Cited

U.S. PATENT DOCUMENTS

| 3,460,334 | 8/1969 | Lawrenson et al. | 57/293 X |
| 4,056,925 | 11/1977 | Vogelsberg | 57/293 |
| 4,214,430 | 7/1980 | Vogelsberg et al. | 57/294 X |
| 4,359,857 | 11/1982 | Oestereich | 57/294 X |

FOREIGN PATENT DOCUMENTS 2411151 9/1975 Fed. Rep. of Germany .
1305559 2/1973 United Kingdom .

Primary Examiner—Donald Watkins
Attorney, Agent, or Firm—Hill, Van Santen, Steadman & Simpson

[57] ABSTRACT

A pipe store for SZ stranding of electrical and/or optical stranding elements is constructed of carbon fibers bonded with adhesive material, whereby the weight is lowered and friction is reduced.

14 Claims, 5 Drawing Figures

PIPE STORE FOR SZ STRANDING

BACKGROUND OF THE INVENTION

1. Field of the Invention

The present invention relates to a pipe store for SZ stranding of electrical and/or optical stranding elements.

2. Description of the Prior Art

Stranding devices of the type mentioned above are known, for example, from the German Letters Patent 682,267, fully incorporated herein by this reference, whereby a rotating stranding disc is provided at the output of a pipe store. The basic structure of such a stranding device is illustrated in FIG. 1, whereby the pipe store, serving as a guide and storage member, is referenced RO. The pipe store RO is alternately rotated for a specific time in the one direction or, respectively, the opposite direction (as indicated by the double-headed arrow RE) over a reversibly functioning drive (for example, in the form of a toothed belt ZR). The drive, for example, can occur over a gear wheel attached to an extension of the pipe store RO, the gear wheel being moved by a toothed belt. The stranding elements, of which only one is illustrated in the present example and referenced VE, are conducted over a stationary perforate guide disc FS at the input side which exhibits a corresponding plurality of axially-extending bores for receiving the stranding elements VE. At its periphery, the perforate guide disc FS is rigidly connected to a corresponding frame or housing. A stranding disc VS which exhibits corresponding axial bores for receiving the stranding elements VE is provided at the output of the pipe store RO. The stranding disc VS is rotatably seated at its periphery by way of a bearing LAV, is rigidly connected to the pipe store RO or, if necessary, can also be separately driven. The stranding elements VE are conducted over a stranding nippe VN at the output of the SZ stranding device. The bearing at the input side is referenced LAE and the "chucking length" of the pipe store RO is referenced l.

Depending on the frictional engagement, the supplied stranding elements VE unwind on the outside of the rotating pipe store RO and thereby transfer the arising torque from the locations of greatest unwinding in the area of the perforate guide disc FS to locations of weaker unwinding in the area of the stranding disc VS. Since the stranding disc VS itself represents a payout brake, torques are transmitted from the intake area at the disc FS to the stranding area depending on the distribution of the frictional forces, in particular, faster or slower depending on the torsional stiffness of the stranding elements VE. The braking torques are compensated directly, or delayed, in the stranding area at the stranding disc VS, so that the stranding itself occurs with only slight or even no torsion. Frictional forces of the pipe store normally consisting of steel which are too high interfere with the distribution of the stranding elements on the pipe store and with the stranding operation itself. On the one hand, they lead to a modulation of the forces at the stranding point which depends on the content of the store and, on the other hand, they effect too high a concentration of the store cabling at the entry side under certain conditions. This can be combatted under certain conditions by additional measures, for example, by an idle pipe piece matched in length, or by other techniques.

A further difficulty in the operation of such pipe stores is that the polar moments of inertia of the pipe are frequently undesirably high for a low drawing or switching. Particularly given great lengths, the high specific weight also leads to an undesired sag of the pipe and to low resonant frequencies which can still lie in the range of operating speeds.

SUMMARY OF THE INVENTION

The object of the present invention, therefore and which relates to a pipe store of the type generally set forth above, is to provide a simple structure for avoiding undesirably high frictional forces between the stranding elements and the pipe store and to reduce the moment of inertia and the specific weight at the same time. Given a device of the type generally set forth above, the object of the invention is achieved in that the material of the pipe store comprises fiber material bonded with cured, hard resins.

Whereas the friction between the smooth steel and the synthetics of the stranding elements (particularly given softer synthetics) is relatively high, fibers saturated with epoxy resin produce, for example, a reduction of the friction between the stranding elements and the pipe store. In comparison to steel pipes, the polar moment of inertia of the pipe store, according to the present invention, is significantly lower and, given dimensions which are otherwise identical, amounts to approximately only one-fourth of this value, whereby significantly higher limits are placed on the reverse acceleration. As a result of the lower specific weight, the sag of even longer pipes is significantly smaller and the resonant frequencies of transverse vibrations of the pipe to be viewed as being chucked at two ends lie correspondingly higher.

Carbon fibers can preferably be employed as the fiber material, these, in addition to their particularly favorable properties of stability, also offering the advantage that they significantly reduce the friction as a result of their self-lubricating properties.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

In the following, a brief theoretical consideration is provided to illustrate the invention. It will be assumed that:

f in meters (m) is the sag of the pipe store RO under its dead weight;

l in (m) is the length of the pipe store between two support points;

D and d in (m) are the outer and the inner diameters, respectively, of the pipe store RO;

E in (N/m²) is the modulus of elasticity of the pipe store RO;

$\gamma$ in (kg/m³=N·s²/m⁴) is the specific weight of the material of the pipe store RO;

P in (N) is the weight;

J in (m⁴) is the moment of inertia; and g is the acceleration due to gravity and is here considered to be 9.81 (m/s²).

From the above, it follows that $$f = (P/E \cdot J)(5l^3/384)$$

where $$P = (D^2 - d^2)(\pi \gamma l/4)$$

and $$J = (D^4 - d^4)\pi/64,$$

so that $$f = 80\gamma g l^4 / 384 E(D^2 + d^2).$$

When, for similar arrangements, the sag is referred to the length, it then follows that $$f/l = [80\gamma g l^3 / 384 E(D^2 + d^2)][(N \cdot m^2/m^3 \cdot N)(m^3/m^2)]$$

From the above one can see:

(a) The length l enters with a power higher by the value one than the diameter D or the diameter d of the pipe store RO, so that simple, linearly-proportional enlargements of the type store are not possible and the relative sag increases with increasing length;

(b) It is meaningful to let d→D, therefore, to make the wall thickness of the pipe store RO as thin as possible, so that advantageous values for the wall thickness lie between 0.5 and 3 mm, preferably around 1.5 mm; and (c) The ratio of $\gamma/E$ should be as small as possible. For steel $$\gamma/E = 7800/(2 \times 10^{11}) = 3.9 \times 10^{-8} s^2/m^2,$$

approximately holds true and, by contrast for carbon fibers bonded with epoxy resin in a resin matrix $$\gamma/E = 1500/(1.5 \times 10^{11}) \ (kg/m^3) \ (m^2/N)$$
$$= 1 \times 10^{-8} \ s^2/m^2,$$

holds true so that considerable elongations of the pipe store can be compensated.

The same is also true of the natural frequency $\omega$. Here, $$\omega = (\pi^4/4)(\sqrt{D^2 + d^2}/l^2)(\sqrt{E/\gamma}) \ [(m/m^2) \ (N/m^2)^{\frac{1}{2}} \ (m^4/N \cdot s^2)^{\frac{1}{2}} = 1/s]$$

By introducing the pipe stores constructed of carbon fibers, this value can be increased approximately by the value 2.

Figure 2:
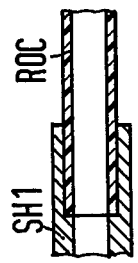
FIG. 2 is a fragmentary sectional view of a first embodiment of the invention.

The mounting of the pipes should occur by way of steel sleeves which are bonded. A first embodiment in this respect is illustrated in FIG. 2, whereby a planar, through surface is achieved at the inside, whereas a steel sleeve SH1 encompasses the pipe ROC formed of carbon fibers. In the embodiment according to FIG. 3, the situation is reverse in that the pipe ROC is seated on a steel sleeve SH2 which has a smaller diameter portion at the outside.

Figure 1:
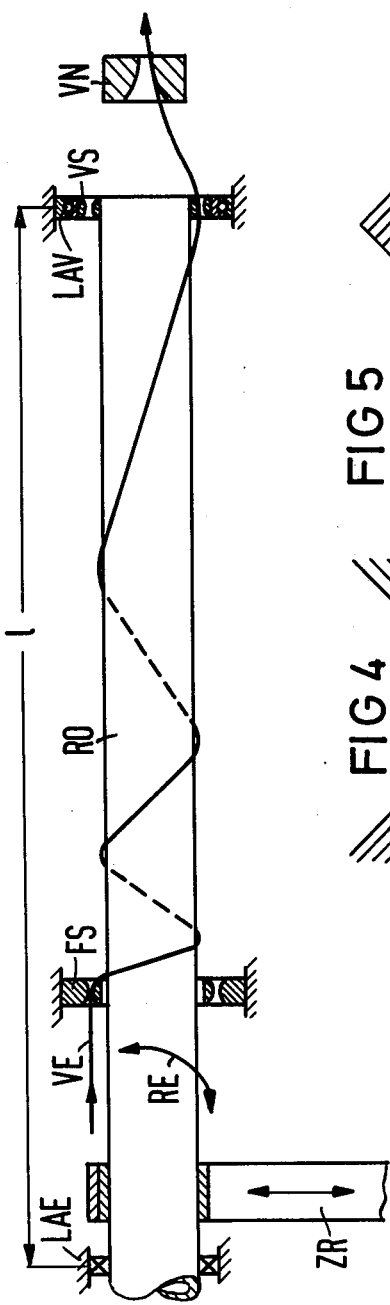
FIG. 1 is a schematic representation of a prior art pipe store.
Figure 3:
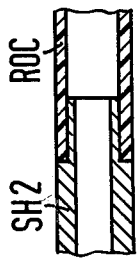
FIG. 3 is a fragmentary sectional view of a second embodiment of the invention.

The steel sleeves SH1 and SH2 of FIGS. 2 and 3 at the same time represent that area in which the bearings LAE and LAV of FIG. 1 are located. It is also advantageous to dispose of the gear wheel assigned to the toothed belt ZR and permanently attached to the surface of the pipe store RO of FIG. 1 to the lagging of the steel sleeve SH1 or of the steel sleeve SH2.

The embodiment according to FIG. 2 is particularly advantageous in this context because the steel sleeve SH1 extends over a greater length on the outside of the pipe store ROC. Furthermore, this embodiment also has the advantage that the clear width of the pipe store ROC is not restricted by the applied steel sleeve SH1. This is of significance when other (already stranded) bundles of leads or other core elements (for example, tensile core elements) are to be conducted through the inside of the pipe store ROC. The embodiment according to FIG. 3 slightly reduces the internal cross-section; however, no enlargement of the contour exists in this case at the outside.

It is also possible to combine the two solutions according to FIGS. 2 and 3, i.e. to undertake a slight enlargement both of the clear width as well as of the outside diameter.

Figure 4:
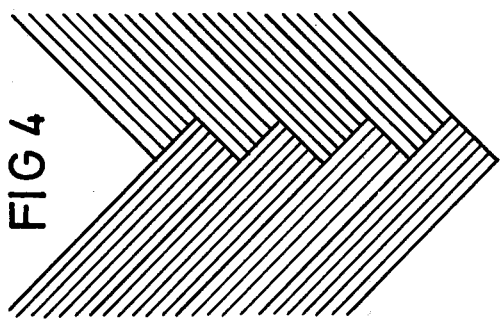
FIG. 4 is an illustration of a partial weave for forming a pipe store according to the present invention.

The individual fibers which are employed in order to form the pipe store are advantageously constructed in the form of tapes which are interwoven and bonded by way of a resin matrix of a resin which is hard in its final condition. More specifically, a partial weave can be employed for this purpose, i.e. an embodiment as schematically illustrated in FIG. 4. The individual parallel line (as a developed view of the circumference) show the direction of the mutually-parallel fibers of respectively one width.

Figure 5:
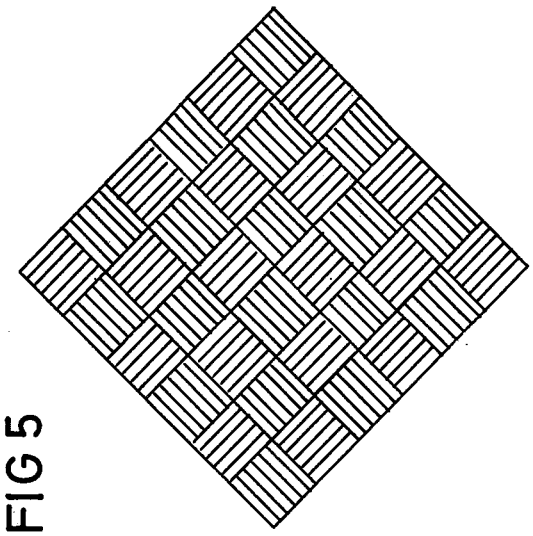
FIG. 5 is a representation of a complete plait for a uniform and mechanically rigid embodiment of the invention.

A more uniform and, particularly mechanically rigid embodiment is illustrated in FIG. 5 which shows a complete plate (in a developed field). The various, approximately tape-shaped individual components are all of the same size and a pattern like a checkerboard derives over all.

In order to improve the stability properties, a plurality of the plaited piles illustrated in FIG. 4 or FIG. 5 are advantageously applied on top of one another in order to form the pipe store. Given a multi-ply arrangement, it is advantageous to have the different plated plies extend in different directions in order to achieve a particularly uniform distribution of the stability properties in all directions.

The fact can be exploited for achieving particularly low friction values that the surface of a pipe store constructed in such a manner produces a reduction of the friction as a result of the rough structure of the surface caused by the fibers. The cause for this is essentially that the leads to be stranded are not completely supported but, rather, only by sections in accordance with the surface structure of the plate or, respectively, in accordance with the course of the fiber path.

Depending on the format of the leads to be stranded, however, it can also be advantageous to keep the pipe store completely smooth by grinding the surface. Particular advantages thereby occur in combination with the use of carbon fibers insofar as the carbon fibers which have a self-lubricating effect come into direct contact with the outer cladding of the leads to be stranded and thereby reduce the friction.

Instead of high-strength (tensile) carbon fibers, aramid fibers can also be employed (for example, in embodiments known under the tradename KEVLAR of the duPont Company). However, the stability properties attainable therewith are not entirely as favorable in comparison to carbon fibers. Among other things, the cause of this is that the bond, as a result of the epoxy resin, does not achieve the advantageous values which are attainable with corresponding carbon fibers.

Particularly coming into consideration as resins, are resins which are particularly hard when cured. Epoxy resins are particularly suitable for this purpose. Under certain conditions, it is also possible to employ polyester resins or polyester imide resins.

In order to secure the fibers in position until curing, a light and correspondingly thin-walled carrier pipe on which the individual fiber plies are placed must be employed when applying the fibers.

In the pipe store, the value of $\gamma/E$ is expediently selected between $0.9\times10^{-}$ and $1.4\times10^{-8}(s/m^2)$ preferably around $1.1\times10^{-8}(s/m^2)$. The length l of the pipe store can advantageously lie between l and 4 m, preferably at 3m.

The stranding elements according to the invention can preferably be employed for constructing electrical and/or optical cables.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In stranding apparatus of the type for SZ stranding of stranding elements in which an elongate pipe store is mounted and driven for rotation through a fixed input apertured guide disc which feeds stranding elements onto the pipe store and with a mutually rotating output apertured stranding disc which feeds the stranding elements in common to an aperture of a stranding nipple, the improvement wherein:
    said pipe store comprises fiber material and cured, hard resin bonding the fiber material.

2. The improved stranding apparatus of claim 1, wherein:
    said pipe store comprises first and second ends each comprising a steel sleeve bonded to said resin-bonded fiber material.

3. The improved stranding apparatus of claim 1, wherein:
    said fiber material has a $\gamma/E$ value in a range of between $0.9\times10^{-8}$ $s^2/m^2$ and $1.4\times10^{-8}$ $s^2/m^2$, where $\gamma$ is the specific weight of the material in $kg/m^3$ and E is the modulus of elasticity.

4. The improved stranding apparatus of claim 3, wherein:
    the $\gamma/E$ value is approximately $1.1\times10^{-8}$ $s^2/m^2$.

5. The improved stranding apparatus of claim 1, wherein:
    said pipe store comprises a wall thickness in a range of between 0.5 mm and 3 mm.

6. The improved stranding apparatus of claim 5, wherein:
    the wall thickness is approximately 1.5 mm.

7. The improved stranding apparatus of claim 1, wherein:
    said pipe store comprises a length in a range of between 1 m and 4 m.

8. The improved stranding apparatus of claim 7, wherein:
    the length is approximately 3m.

9. The improved stranding apparatus of claim 1, wherein:
    said resin comprises epoxy resin.

10. The improved stranding apparatus of claim 1, wherein:
    said fiber material comprises carbon fibers.

11. The improved stranding apparatus of claim 1, wherein:
    said fiber material comprises aramide.

12. The improved stranding apparatus of claim 1, wherein:
    said pipe store comprises a light, this carrier pipe supporting the resin-bonded fiber material.

13. The improved stranding apparatus of claim 1, wherein:
    said resin-bonded fiber material is constituted by strips of the fiber material.

14. The improved stranding apparatus of claim 13, wherein:
    said strips are woven together in a pattern to reduce friction.

* * * * *